(12) United States Patent
Nakashima et al.

(10) Patent No.: US 12,441,073 B2
(45) Date of Patent: Oct. 14, 2025

(54) PRESS MACHINE

(71) Applicant: ASAHI-SEIKI MANUFACTURING CO., LTD., Owariasahi (JP)

(72) Inventors: Keiji Nakashima, Owariasahi (JP); Keisuke Wakasugi, Seto (JP)

(73) Assignee: ASAHI-SEIKI MANUFACTURING CO., LTD., Owariasahi (JP)

( * ) Notice: Subject to any disclaimer, the term of this patent is extended or adjusted under 35 U.S.C. 154(b) by 249 days.

(21) Appl. No.: 18/122,866

(22) Filed: Mar. 17, 2023

(65) Prior Publication Data

US 2023/0311441 A1  Oct. 5, 2023

(30) Foreign Application Priority Data

Mar. 30, 2022 (JP) ................................. 2022-054907

(51) Int. Cl.
    *B21D 43/05* (2006.01)
    *B21D 43/02* (2006.01)
    *B30B 1/26* (2006.01)

(52) U.S. Cl.
    CPC .............. *B30B 1/261* (2013.01); *B21D 43/02* (2013.01)

(58) Field of Classification Search
    CPC .... B21D 24/005; B21D 35/003; B21D 43/05; B30B 1/261; B30B 1/26
    See application file for complete search history.

(56) References Cited

U.S. PATENT DOCUMENTS

| | | | | |
|---|---|---|---|---|
| 3,785,194 | A * | 1/1974 | Bradlee | B21K 27/04 72/405.13 |
| 5,012,661 | A | 5/1991 | Catti et al. | |
| 2022/0241835 | A1 | 8/2022 | Mori et al. | |

FOREIGN PATENT DOCUMENTS

| | | |
|---|---|---|
| CN | 207414086 U | 5/2018 |
| CN | 111229967 A | 6/2020 |
| CN | 111659789 A | 9/2020 |
| CN | 113891769 A | 1/2022 |
| EP | 3738690 A1 | 11/2020 |
| EP | 3771504 A1 | 2/2021 |
| JP | S49-71557 A | 7/1974 |

(Continued)

OTHER PUBLICATIONS

Jun. 21, 2022 Office Action Issued in Japanese Patent Application No. 2022-054907.

(Continued)

*Primary Examiner* — Debra M Sullivan
(74) *Attorney, Agent, or Firm* — Oliff PLC

(57) ABSTRACT

A press machine includes: a ram, a shaft, and three or more ram driving cams, for the one ram, configured to push down the ram toward a bottom dead center, the plurality of ram driving cams being integrally rotatable with the common shaft. Both end portions of the shaft are rotatably supported by a pair of rotation support portions fitted to the both end portions between which all of the plurality of ram driving cams are disposed, and an intermediate portion of the shaft disposed between the ram driving cams is rotatably supported by a support groove opened downward. The plurality of ram driving cams includes at least two lifting and lowering cams configured to apply both a pushing down force and a pushing up force to the ram, and at least one lowering cam configured to apply only the pushing down force to the ram.

5 Claims, 5 Drawing Sheets

(56) References Cited

FOREIGN PATENT DOCUMENTS

| | | | |
|---|---|---|---|
| JP | H02-224821 A | 9/1990 | |
| JP | H04-288931 A | 10/1992 | |
| JP | H07214399 A | 8/1995 | |
| JP | H8-155699 A | 6/1996 | |
| JP | 2878956 * | 4/1999 | ............... B30B 1/26 |
| JP | 2878956 B2 | 4/1999 | |
| JP | H11-90547 A | 4/1999 | |
| JP | H11309598 A | 11/1999 | |
| JP | 2005-224855 A | 8/2005 | |
| JP | 2016-198819 A | 12/2016 | |
| JP | 2021-120161 A | 8/2021 | |

OTHER PUBLICATIONS

Nov. 8, 2022 Office Action Issued in Japanese Patent Application No. 2022-054907.
Aug. 21, 2023 Extended European Search Report issued in European Patent Application No. 23162965.0.
Sep. 1, 2023 Office Action issued in European Patent Application No. 23 162 965.0.
May 14, 2025 Request for the Submission of an Opinion issued in Korean Patent Application No. 10-2023-0019143.
Jul. 25, 2025 Office Action issued in Chinese Patent Application No. 202310140941.4.

* cited by examiner

PRESS MACHINE

BACKGROUND OF THE INVENTION

(1) Field of the Invention

The present disclosure relates to a press machine.

(2) Description of Related Art

Conventionally, as such type of press machine, a press machine that lifts and lowers a ram with a cam is known (see, for example, JP 2021-120161 A (paragraph)) [0028])).

SUMMARY OF THE INVENTION

It is required to improve processing accuracy of press working with respect to the conventional press machine described above.

A press machine according to one aspect of the present disclosure made in order to solve the above problem includes, a ram, a shaft, and three or more ram driving cams, for the one ram, configured to push down the ram toward a bottom dead center, the plurality of ram driving cams being integrally rotatable with the common shaft. Both end portions of the shaft are rotatably supported by a pair of rotation support portions fitted to the both end portions between which all of the plurality of ram driving cams are disposed. An intermediate portion of the shaft disposed between the ram driving cams is rotatably supported by a support groove opened downward, and the plurality of ram driving cams includes at least two lifting and lowering cams configured to apply both a pushing down force and a pushing up force to the ram, and at least one lowering cam configured to apply only the pushing down force to the ram.

Further, a press machine according to another aspect of the present disclosure includes: a ram, a shaft, and three or more ram driving cams, for the one ram, configured to push down the ram toward a bottom dead center, the plurality of ram driving cams being integrally rotatable with the common shaft. A plurality of working stages arranged along an axial direction of the shaft below the ram, and on which press working of a plurality of workpieces is simultaneously performed by lowering of the ram, and a transfer device configured to convey each of the plurality of workpieces on the plurality of working stages to adjacent one of the plurality of working stages each time the ram moves up and down, are included, in the working stage at an upstream end portion, a workpiece production mechanism to punch a blank from a sheet metal and configured to form the blank into a cylindrical workpiece is provided. In the plurality of working stages on a downstream side in a workpiece conveyance direction of the workpiece production mechanism, the cylindrical workpiece is formed by drawing or ironing, and the two ram driving cams on the upstream side in the workpiece conveyance direction are disposed on both sides of the workpiece production mechanism. The workpiece production mechanism includes a first punch having a cylindrical shape, fixed to the ram, and configured to punch the blank from the sheet metal, a second punch fitted inside the first punch and configured to form the blank into a cylindrical workpiece, and an auxiliary cam configured to be provided integrally rotatably with the shaft and lift and lower the second punch at a timing different from a lifting and lowering operation of the ram.

DETAILED DESCRIPTION OF PREFERRED EMBODIMENTS

First Embodiment

Figure 1:
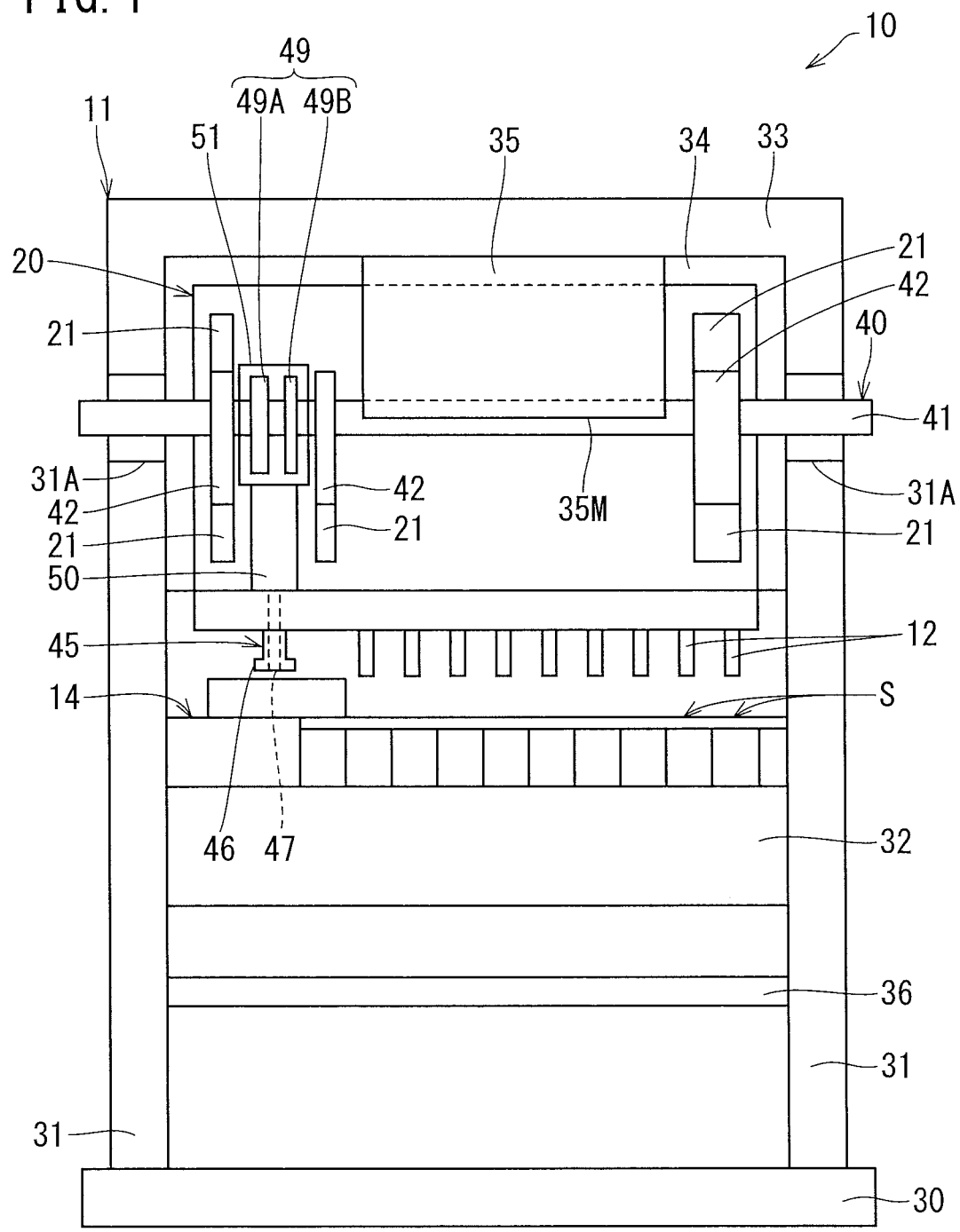
FIG. 1 is a front view of a press machine according to a first embodiment.

A press machine 10 according to one embodiment of the present disclosure will be described with reference to FIGS. 1 and 2. FIG. 1 is a front view of the press machine 10 according to the present embodiment as viewed from the front. The press machine 10 is a so-called transfer press machine, and holds a plurality of punches 12 laterally aligned at a lower end portion of a ram 20 and holds a plurality of dies (not illustrated) corresponding thereto laterally aligned on a support beam 32. Moreover, a plurality of working stages S for processing the workpiece by the punches 12 and the dies is provided. Further, in a working stage S at a left side end portion of the plurality of working stages S, a cylindrical workpiece is formed after a blank is punched out from a sheet metal. In order to perform a two-stage motion as described above, the working stage S at the left side end portion is provided with a workpiece production mechanism 45 to be described in detail later. Moreover, the cylindrical workpiece is sequentially conveyed to the working stage S on the downstream side by a transfer device 14, and is subjected to drawing or ironing to form a pressed product having a predetermined shape.

A drive mechanism of the ram 20 will now be described. Hereinafter, a lateral direction of the press machine 10 in FIG. 1 is referred to as a "workpiece conveyance direction H1", the left side (left side in FIG. 1) when the press machine 10 is viewed from the front is referred to as an "upstream side in the workpiece conveyance direction H1", and the opposite side thereof is referred to as a "downstream side in the workpiece conveyance direction H1".

The ram 20 is supported by a support frame 11 so as to be movable up and down. The support frame 11 has a pair of side support walls 31 standing upright from a pedestal portion 30 and facing each other in the lateral direction. The support beam 32 is bridged between the pair of side support walls 31 near the lower end portion, and a ceiling wall 33 is bridged over an upper end portion. Further, a ram support wall 34 is provided above substantially the center of the pair of side support walls 31 in a vertical direction. The ram support wall 34 is bridged between the pair of side support walls 31 at a position close to a rear end portion in a front-rear direction (on a back side in a depth direction in FIG. 1), and the upper end portion thereof is connected to the ceiling wall 33. Further, a plurality of rails (not illustrated) extending in the vertical direction is attached to a front surface of the ram support wall 34. Moreover, a slider fixed to a rear surface of the ram 20 is engaged with the rails, and the ram 20 is supported slidably in the vertical direction.

A pair of rotation support portions 31A is provided at a position near the upper end portion of the pair of side support walls 31. Moreover, the both end portions of a shaft 41 extending in the workpiece conveyance direction H1 are rotatably supported by being fitted to bearings or metal bearings provided in the pair of rotation support portions 31A.

Three or more ram driving cams 42 are integrally rotatably fixed to the shaft 41. The ram driving cams 42 have a common cam curve. Specifically, each ram driving cam 42 has a circular shape, and the center of the shaft 41 is located at a position shifted from the center of the circular shape. In the present embodiment, a case where three ram driving cams 42 are provided will be described as an example. Hereinafter, in in order to distinguish the three ram driving cams 42, they are referred to as "first to third ram driving cams 42" in order from the upstream side in the workpiece conveyance direction H1. Further, the entirety of the shaft 41 and the plurality of ram driving cams 42 will be referred to as a "cam shaft 40".

The first ram driving cam 42 and the third ram driving cam 42 are disposed close to the pair of rotation support portions 31A of the shaft 41. On the other hand, the second ram driving cam 42 is disposed close to the first ram driving cam 42.

The first and second ram driving cams 42 disposed on the upstream side in the workpiece conveyance direction H1 are thinner than the third ram driving cam 42 on the downstream side. In the present embodiment, the thickness of the first and second ram driving cams 42 is about ⅔ of the thickness of the third ram driving cam 42, but the present invention is not limited thereto. Further, although both the first and second ram driving cams 42 are thinner than the third ram driving cam 42, for example, only one of the first and second ram driving cams 42 may be thinner than the third ram driving cam 42 (see FIG. 5A), or the three ram driving cams 42 may have the same thickness (see FIG. 5B), or may have different thicknesses. In addition, in the present disclosure, the left side in FIG. 1 with respect to the center of the ram 20 in the workpiece conveyance direction H1 (the lateral direction) as a boundary is referred to as an "upstream side in the workpiece conveyance direction H1", and the right side from the center is referred to as a "downstream side in the workpiece conveyance direction H1".

A plurality of abutting portions 21 abutting on the plurality of ram driving cams 42 are rotatably supported in the ram 20. Specifically, a pair of abutting portions 21 is provided at positions of the ram 20 corresponding to the first and third ram driving cams 42 so as to sandwich the first and third ram driving cams 42 in the vertical direction. On the other hand, the abutting portion 21 is provided only on the lower side of the second ram driving cam 42 at a position corresponding to the second ram driving cam 42. In other words, the first and third ram driving cams 42 at both ends are lifting and lowering cams that perform both push up and push down of the ram 20, while the second ram driving cam 42 disposed between the lifting and lowering cams is a lowering cam that only pushes down the ram 20.

The abutting portions 21 are, for example, rollers, and are disposed between a pair of support projecting walls (not illustrated) projecting forward from the ram 20 and facing each other in the lateral direction. Moreover, a support shaft that is passed between the pair of support projecting walls penetrates the bearings provided at a center portion of the abutting portions 21. Instead of the bearings, metal bearings may be provided at the center portion of the ram 20. Further, the abutting portions 21 are not limited to the rollers, and for example, may have a structure in which protruding walls protruding from the ram 20 and facing the ram driving cam 42 from above or below are provided, an arc-shaped groove is provided in the protruding wall, and an inner surface of the groove is covered with a sliding metal, and the ram driving cam 42 abuts on the sliding metal.

As described above, a space between the second ram driving cam 42 and the third ram driving cam 42 of the shaft 41 is wider than a space between the first ram driving cam 42 and the second ram driving cam 42. A shaft support portion 35 is provided between the second ram driving cam 42 and the third ram driving cam 42. The shaft support portion 35 hangs down from the ceiling wall 33 and has a support groove 35M on the lower surface thereof. The support groove 35M has a shape recessed upward, and a recessed inner surface thereof is covered with the sliding metal. Moreover, an outer peripheral surface of the intermediate portion of the shaft 41 abuts on the inner surface of the support groove 35M to suppress upward bending deformation of the intermediate portion of the shaft 41. The support groove 35M of the present embodiment is a groove having a semicircular cross section, but may be, for example, a V-shaped groove.

On the other hand, the workpiece production mechanism 45 is disposed between the first ram driving cam 42 and the second ram driving cam 42 of the shaft 41. Specifically, the workpiece production mechanism 45 includes a cylindrical first punch 46 that punches a blank from a sheet metal, and a second punch 47 that is provided inside the first punch 46 and forms the blank into a cylindrical workpiece. The first punch 46 moves up and down integrally with the ram 20, whereas the second punch 47 moves up and down by a lifting and lowering operation different from that of the ram 20. An auxiliary cam 49 for lifting and lowering the second punch 47 by a lifting and lowering operation different from that of the ram 20 is provided between the first ram driving cam 42 and the second ram driving cam 42.

The auxiliary cam 49 is integrally rotatably supported by the shaft 41, and has a cam curve different from the cam curve of the ram driving cam 42. In the present embodiment, the auxiliary cam 49 includes a lowering cam 49A for lowering the second punch 47 and a lifting cam 49B for lifting the second punch 47, but the second punch 42 may be lifted and lowered by one cam. Further, in the present embodiment, thicknesses of the lowering cam 49A and the lifting cam 49B are different (specifically, the lowering cam 49A is thicker than the lifting cam 49B), but may be the same.

A rail (not illustrated) extending in the vertical direction is attached below the auxiliary cam 49 in the ram 20. A slider 50 is slidably supported by the rail. The second punch 47 is fixed to the lower end portion of the slider 50, and a support frame 51 is connected to the upper end portion thereof. The support frame 51 has a size capable of accommodating the lowering cam 49A and the lifting cam 49B inside, rotatably supports an abutting portion (not illustrated) abutting on the lowering cam 49A at the lower end portion, and rotatably supports an abutting portion (not illustrated) abutting on the lifting cam 49B at the upper end portion. Accordingly, the lowering cam 49A slides the slider 50 downward via the lower abutting portion to lower the second punch 47, and the lifting cam 49B slides the slider 50 upward via the upper abutting portion to lift the second punch 47.

The configuration of the press machine 10 of the present embodiment has been described as above. Next, effects of the press machine 10 will be described. When the press machine 10 is started, the cam shaft 40 is rotationally driven, the ram 20 moves up and down, and then press working of a workpiece is performed. Here, since the processing reaction force applied to the ram 20 during the press working varies depending on locations of the ram 20, the ram 20 may tilt. However, in the press machine 10 of the present embodiment, three or more ram driving cams 42 are provided, and the ram 20 is pushed down by the three or more ram driving cams 42. Therefore, even when magnitude of the processing reaction force received by the ram 20 differs depending on the locations of the ram 20, an inclination of the ram 20 can be suppressed, and the processing accuracy can be improved as compared with the conventional art.

Moreover, in the press machine 10 of the present embodiment, since the intermediate portion of the shaft 41 is rotatably supported by the support groove 35M opened downward, the inclination of the ram 20 is suppressed while the assembly is easy, and the processing accuracy is improved. Specifically, the press machine 10 receives a larger load on the shaft 41 when the ram 20 is lowered to perform press working than when the ram 20 is lifted. In other words, an upward load applied to the shaft 41 is larger than a downward load. However, if the rotation support portions 31A fitted to each of the both end portions and the intermediate portion of the shaft 41 are provided, it is difficult to assemble the shaft 41 to the plurality of rotation support portions 31A. On the other hand, in the press machine 10, since the shaft 41 is rotatably supported at the both end portions by the pair of rotation support portions 31A and the intermediate portion is rotatably supported by the support groove 35M opened downward, the bending of the shaft 41 due to the upward load is suppressed while the assembly is easy. In other words, the bending of the shaft 41 during press working is suppressed, the inclination of the ram 20 is also suppressed, and the processing accuracy is improved.

Figure 2A:
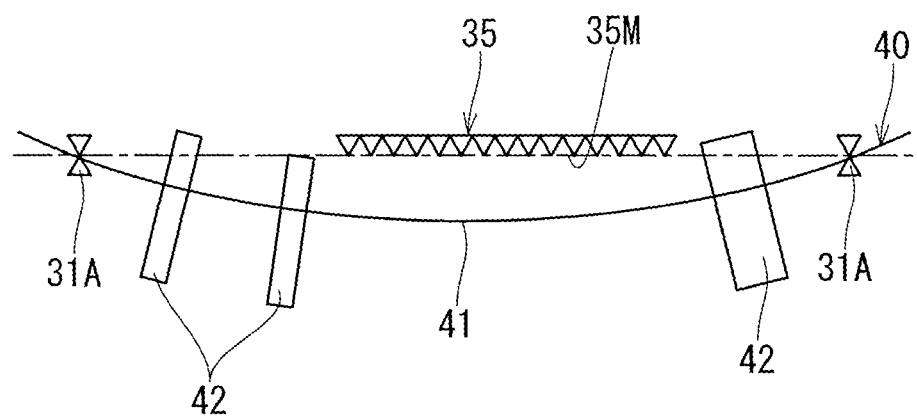
FIG. 2A is a conceptual diagram illustrating a state in which a cam shaft is bent by its own weight.
Figure 2B:
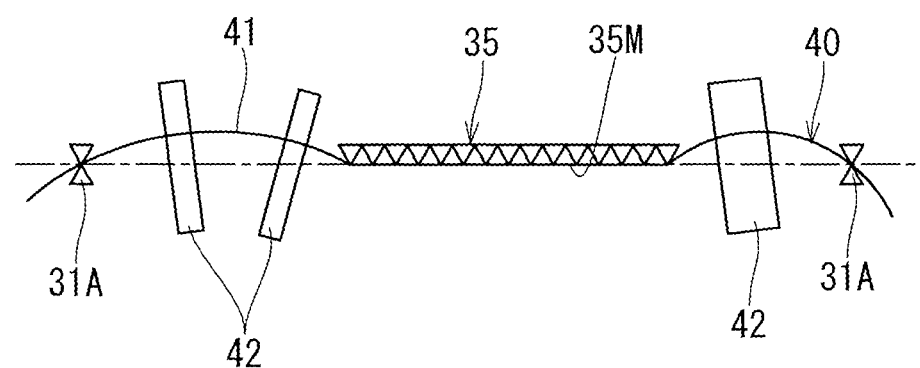
FIG. 2B is a conceptual diagram illustrating a state in which the cam shaft is bent by a processing reaction force.

Here, in FIGS. 2A and 2B, the bending of the shaft 41 obtained by the simulation is shown in an emphasized way. Specifically, FIG. 2A illustrates a state in which the shaft 41 is bent downward by receiving an own weight of the ram 20 as a load from above, and FIG. 2B illustrates a state in which the shaft 41 is bent upward by receiving a processing reaction force from below. As described above, in the press machine 10 of the present embodiment, the ram driving cams 42 at both ends of the shaft 41 are lifting and lowering cams provided with the abutting portions 21 above and below thereof, and the middle ram driving cam 42 is a lowering cam provided with the abutting portion 21 only therebelow, and further, there is a clearance between the lifting and lowering cams and the upper and lower abutting portions 21. Further, the both end portions of the shaft 41 are supported by the rotation support portion 31A, and the intermediate portion thereof is supported by the support groove 35M. Accordingly, the shaft 41 receives a load from above only via the ram driving cams 42 at both ends and bends downward as illustrated in FIG. 2A. On the other hand, as illustrated in FIG. 2B, the shaft 41 can receive a load from below via all the ram driving cams 42 in a state where an upward movement is restricted with respect to the load from below. Accordingly, as well as the assembly of the shaft 41 is easy as described above, the bending of the shaft 41 during press working is suppressed, the inclination of the ram 20 is also suppressed, and the processing accuracy is improved.

As illustrated in FIGS. 2A and 2B, since both end portions of the shaft 41 are supported by the rotation support portions 31A, a displacement amount in the vertical direction at the positions near both ends is smaller than that at the intermediate portion. Moreover, since the first and third ram driving cams 42 at both ends of the plurality of ram driving cams 42 are used as lifting and lowering cams, abutting on the upper and lower abutting portions 21 can be stabilized. On the other hand, the lowering cam which is the second ram driving cam 42 is disposed away from both ends of the shaft and can be displaced up and down together with the shaft 41, but since the abutting portion 21 is not provided on the upper side, a situation in which collision with the abutting portion 21 on the upper side is repeated can be prevented. Further, while it is necessary to provide the ram 20 with a pair of the abutting portions 21 that abut on the lifting and lowering cam from above and below, and it is only necessary to provide the ram 20 with one abutting portion 21 that abuts on the lowering cam from below, and therefore, manufacturing costs including time and efforts for assembly can be suppressed. In addition, the second ram driving cam 42 and the upper abutting portion 21 if provided, may point contact due to the bending of the shaft 41, and the bearing of the abutting portion 21 may be damaged. However, as described above, since the upper abutting portion 21 is not provided, such situation can be prevented. Further, the intermediate portion of the shaft 41 supported by the support groove 35M can be displaced up and down together with the shaft 41 and collide with the support groove 35M. However, since an area of the intermediate portion and the support groove 35M is larger than that of the second ram driving cam 42 and the abutting portions 21, and the intermediate portion and the support groove 35M surface contact with each other, the intermediate portion is less likely to be damaged.

Further, in the press machine 10 including the plurality of working stages S, the processing reaction force is larger in the working performed on the working stage S on the upstream side in the workpiece conveyance direction H1 than in the working performed on the working stage S on the downstream side. In particular, as in the press machine 10 of the present embodiment, in the press machine 10 having the workpiece production mechanism 45 that punches the blank from the sheet metal at an upstream side end portion of the working stage S and then forms the cylindrical workpiece, the processing reaction force tends to be larger on the upstream side of the ram 20 in the workpiece conveyance direction H1. To cope with this, in the press machine 10 of the present embodiment, since more ram driving cams 42 are disposed on the upstream side in the workpiece conveyance direction H1 than on the downstream side, the inclination of the ram 20 is suppressed, and the processing accuracy can be improved.

Furthermore, in the present embodiment, by disposing the second ram driving cam 42 close to the upstream side in the workpiece conveyance direction H1, the support groove 35M can be arranged in the intermediate portion of the shaft 41, and thus the bending of the shaft due to the upward load can be effectively suppressed. Further, in the present embodiment, since the first and second ram driving cams 42 are thinner than the third ram driving cam 42, it is possible to suppress the shaft 41 from becoming large in the axial direction.

Second Embodiment

Figure 3:
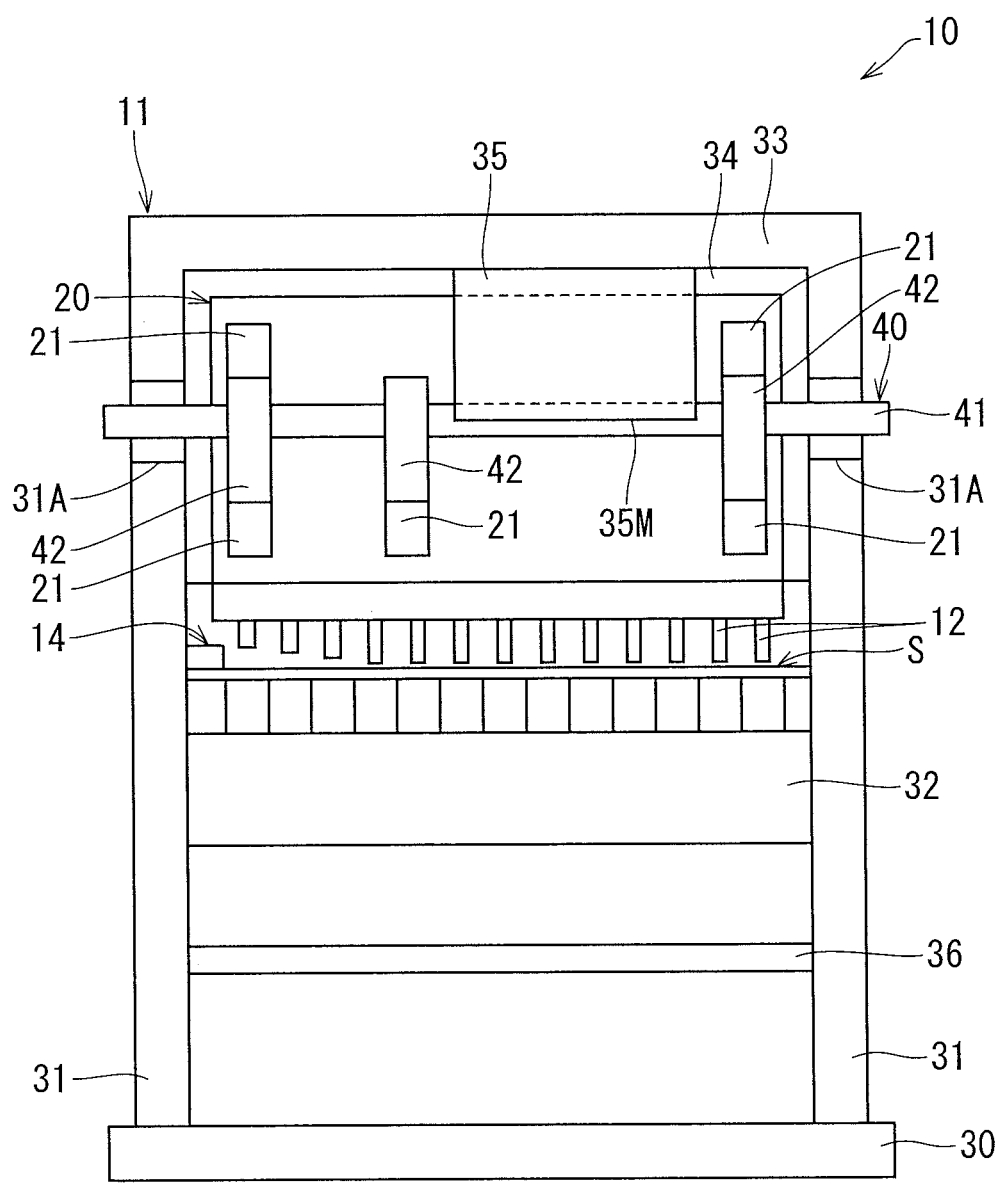
FIG. 3 is a front view of a press machine according to a second embodiment.

The press machine 10 of the present embodiment is illustrated in FIG. 3, and is different from the press machine 10 of the first embodiment in not including the workpiece production mechanism 45. Also in the press machine 10 of the present embodiment, since the ram 20 receives different processing reaction forces depending on the locations, three or more ram driving cams 42 are provided, and by pushing down the ram 20 with the three or more ram driving cams 42, similarly to the press machine 10 of the first embodiment, it is possible to suppress the inclination of the ram 20 and improve the processing accuracy as compared with the conventional art.

Third Embodiment

Figure 4:
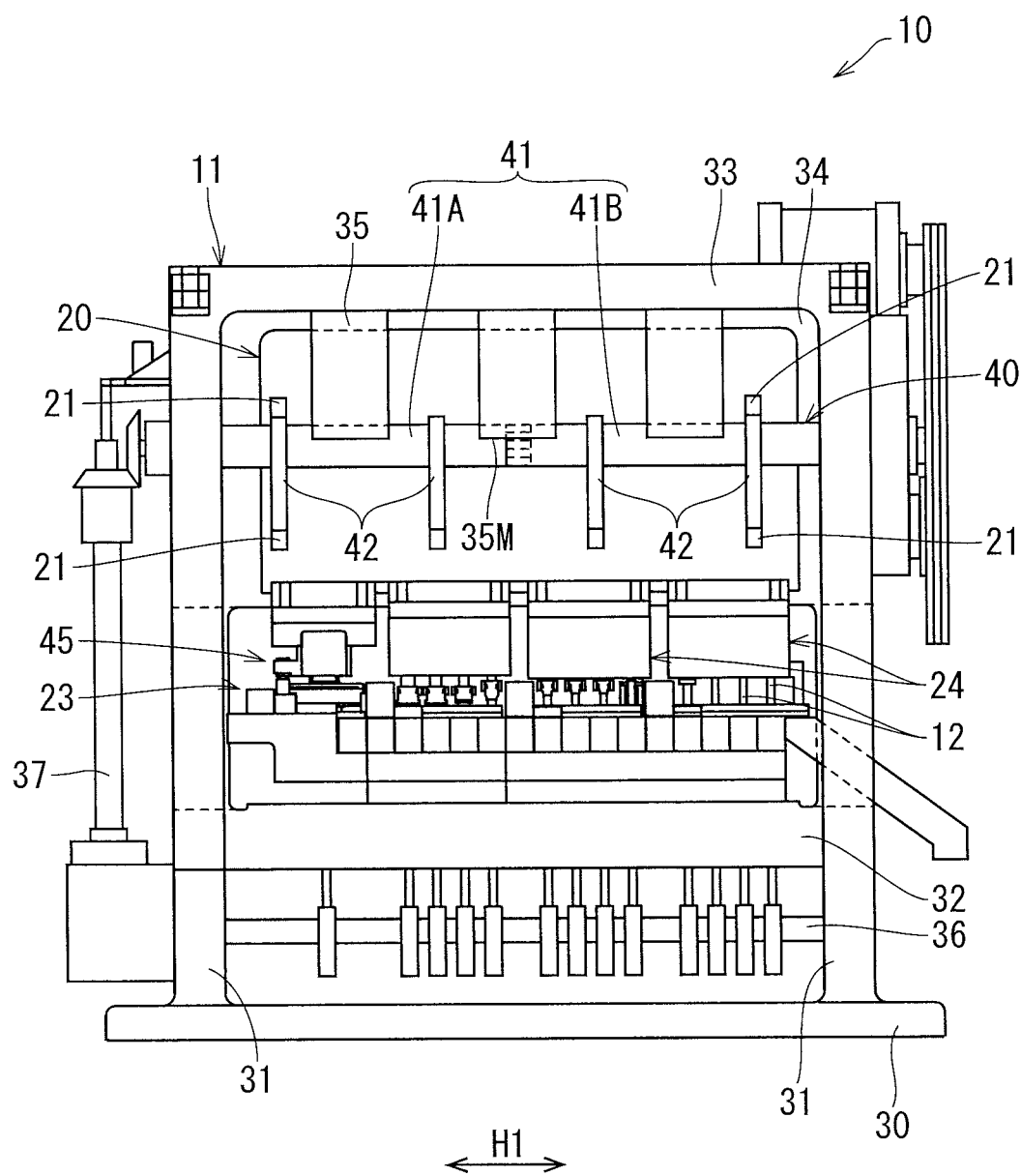
FIG. 4 is a front view of a press machine according to a third embodiment.

The press machine 10 of the present embodiment is illustrated in FIG. 4, and is different from the press machine 10 of the first embodiment in that the punches 12 and the dies are fixed via die sets 23 and 24. Further, in the press machine 10 of the present embodiment, the shaft 41 is formed by connecting a first shaft 41A and a second shaft 41B by, for example, a spline, whereby one shaft 41 includes a plurality of, three or more (for example, four) ram driving cams 42. The present embodiment also achieves the effects similar to those of the first embodiment.

OTHER EMBODIMENTS (1) In the above embodiment, the so-called transfer press machine including the plurality of working stages S and the transfer device 14 is exemplified as the press machine 10, but a press machine not including the transfer device 14 may be used. In addition, as in the above embodiment, by applying the configuration of the present disclosure to the transfer press machine, the inclination of the ram is suppressed as compared with the conventional art. Thus, it is possible to enjoy the effect of improving the processing accuracy.

(2) In the workpiece production mechanism 45 of the above embodiment, the second punch 47 communicates with the auxiliary cam 49 provided integrally rotatably with the shaft 41 via the slider 50, but the present invention is not limited thereto, and the following configuration may be adopted. In other words, an auxiliary shaft 36 (see FIG. 1) extending in parallel with the shaft 41 below the support beam 32 and rotating in conjunction with the shaft 41 may be provided, an auxiliary cam may be provided in the auxiliary shaft 36, and a lever may be tiltably supported by the support frame 11 of the press machine 10 and tilted by the auxiliary cam, so that the second punch may be connected to a tip end of a tilting lever thereof. Further, an auxiliary shaft 37 that extends vertically outside the support frame 11 of the press machine 10 supporting the ram 20 so as to be movable up and down and that is connected to the shaft 41 may be provided (see FIG. 4). One end of the tilting lever tiltably supported by the support frame 11 may be engaged with an auxiliary cam provided in the auxiliary shaft 37, and the other end may be connected to the second punch.

(3) The three or more ram driving cams 42 of the above embodiment include at least two lifting and lowering cams and at least one lowering cam, but the present configuration is not limited thereto. Specifically, for example, at least two lifting and lowering cams and at least one lifting cam that only pushes up the ram 20 may be included, or at least two lifting and lowering cams, at least one lifting cam, and at least one lowering cam may be included. Further, all the ram driving cams 42 may be lifting and lowering cams.

Figure 5A:
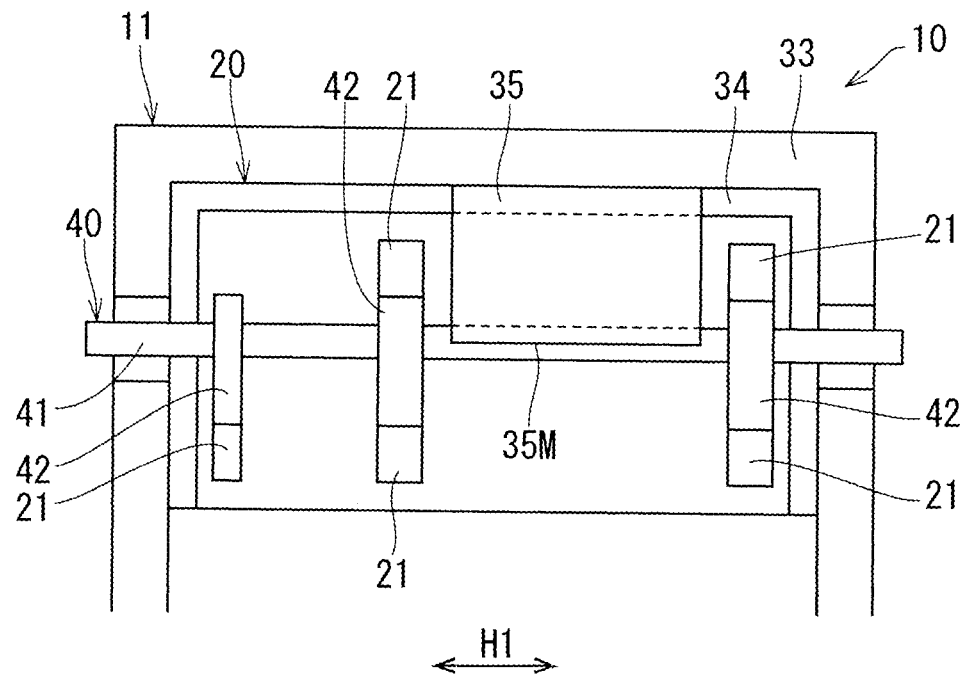
FIGS. 5A and 5B are front views of a press machine according to a modification.

(4) Further, in the above embodiment, the ram driving cams 42 at both ends are lifting and lowering cams, and the ram driving cams 42 disposed between the lifting and lowering cams are lowering cams. However, for example, as illustrated in FIG. 5A, one of the ram driving cams 42 at both ends may be a lowering cam, and the other ram driving cams 42 may be lifting and lowering cams.

Figure 5B:
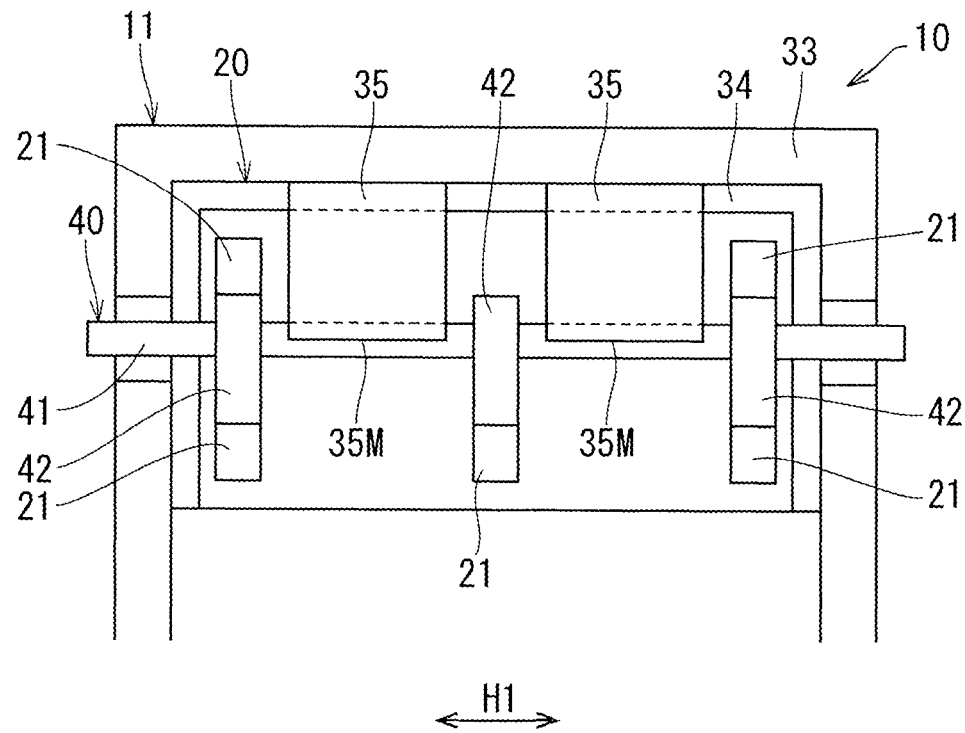

(5) In the above embodiment, the plurality of ram driving cams 42 is disposed in a larger number on the upstream side than on the downstream side in the workpiece conveyance direction H1, but for example, the plurality of ram driving cams may be disposed in a larger number on the downstream side in the workpiece conveyance direction H1. Alternatively, as illustrated in FIG. 5B, the ram driving cams 42 may be arranged at equal intervals with respect to the workpiece conveyance direction H1.

(6) In the above embodiment, the shaft support portion 35 is disposed in a section in which a gap between the ram driving cams 42 is wide among the plurality of ram driving cams 42 (specifically, between the second ram driving cam 42 and the third ram driving cam 42), but the shaft support portion 35 may be disposed in a section in which the gap between the ram driving cams 42 is narrow (for example, between the first ram driving cam 42 and the second ram driving cam 42). Further, the number of the shaft support portions 35 is not limited to one, and a plurality of the shaft support portions may be provided as illustrated in FIGS. 4 and 5B.

(7) In the above embodiment, the clearance is provided between the ram driving cam 42 and the abutting portions 21, but the clearance may not be provided.

In addition, although specific examples of the technology included in the claims are disclosed in the present specification and the drawings, the technology described in the claims is not limited to these specific examples, includes those obtained by variously modifying and changing the specific examples, and further includes those obtained by singly extracting a part from the specific examples.

What is claimed is:
1. A press machine comprising:
a support frame;
a ram supported by the support frame so as to be movable up and down, the ram including a plurality of punches protruding from the ram downward;
three or more ram driving cams, configured to push down the ram toward a bottom dead center, the three or more ram driving cams including:
at least two lifting and lowering cams configured to apply both a pushing down force and a pushing up force to the ram, and
at least one lowering cam configured to apply only the pushing down force to the ram;
a shaft that is rotatably supported by the support frame and that integrally rotates with the ram driving cams;
a plurality of working stages arranged in an axial direction of the shaft below the ram and including a plurality of does corresponding to the plurality of punches, the plurality of punches of the ram being arranged in the axial direction of the shaft; and
a workpiece production mechanism provided in a working stage of the plurality of working stages at an end in an aligning direction of the plurality of working stages and configured to punch a blank from a sheet metal and to form the blanks into a cylindrical workpiece, the workpiece production mechanism including:
a first punch having a cylindrical shape, fixed to the ram, and configured to punch the blank from the sheet metal;
a second punch fitted inside the first punch and configured to form the blank into a cylindrical workpiece, and
an auxiliary cam provided integrally rotatable with the shaft and configured to lift and lower the second punch at a timing different from a lifting and lowering operation of the ram, wherein:

the support frame includes a pair of rotation support portions fitted to both end portions of the shaft between which all of the ram driving cams are disposed, and rotatably supporting the both end portions;

a support groove is provided in a shaft support portion that is fixed to the support frame, having shape opened downward, and rotatably supporting an intermediate portion of the shaft disposed between the ram driving cams;

two of the ram driving cams are disposed on both sides of the workpiece production mechanism; and the cylindrical workpiece is formed using the punches and the dies by drawing or ironing in the plurality of working stages on a downstream side of the workpiece production mechanism in a workpiece conveyance direction.

2. The press machine according to claim 1, wherein the lifting and lowering cams are arranged at both ends of the ram driving cams.

3. The press machine according to claim 1, wherein press working of a plurality of workpieces is simultaneously performed on the plurality of working stages by lowering of the ram.

4. The press machine according to claim 2, wherein press working of a plurality of workpieces is simultaneously performed on the plurality of working stages by lowering of the ram.

5. A press machine comprising:

a ram, a shaft, three or more ram driving cams configured to push down the ram toward a bottom dead center, the three or more ram driving cams being integrally rotatable with the shaft, a plurality of working stages arranged along an axial direction of the shaft below the ram, and on which press working of a plurality of workpieces is simultaneously performed by lowering of the ram, and a workpiece production mechanism provided in a working stage of the plurality of working stages at an upstream end portion, the workpiece production mechanism being configured to punch a blank from a sheet metal and to form the blank into a cylindrical workpiece, wherein:

two of the ram driving cams are disposed on an upstream side in a workpiece conveyance direction and are disposed on both sides of the workpiece production mechanism, the workpiece production mechanism includes a first punch having a cylindrical shape, fixed to the ram, and configured to punch the blank from the sheet metal, a second punch fitted inside the first punch and configured to form the blank into a cylindrical workpiece, and an auxiliary cam provided integrally rotatably with the shaft and configured to lift and lower the second punch at a timing different from a lifting and lowering operation of the ram, and the cylindrical workpiece is formed into a pressed product by drawing or ironing the cylindrical workpiece in the plurality of working stages on a downstream side of the workpiece production mechanism in a workpiece conveyance direction.

* * * * *

UNITED STATES PATENT AND TRADEMARK OFFICE
CERTIFICATE OF CORRECTION

| | | |
|---|---|---|
| PATENT NO. | : 12,441,073 B2 | Page 1 of 1 |
| APPLICATION NO. | : 18/122866 | |
| DATED | : October 14, 2025 | |
| INVENTOR(S) | : Keiji Nakashima et al. | |

It is certified that error appears in the above-identified patent and that said Letters Patent is hereby corrected as shown below:

In the Claims

In Claim 1, at Column 8, Lines 50–51, "a plurality of does" should be -- a plurality of dies --.

Signed and Sealed this
Thirteenth Day of January, 2026

John A. Squires
*Director of the United States Patent and Trademark Office*